Dec. 6, 1927.

H. ZIMMERMAN

BIRD CAGE BOTTOM

Filed Dec. 1, 1925

1,651,982

INVENTOR
Hymen Zimmerman
BY
Harry Jacobson
ATTORNEY

Patented Dec. 6, 1927.

1,651,982

UNITED STATES PATENT OFFICE.

HYMEN ZIMMERMAN, OF NEW YORK, N. Y., ASSIGNOR TO ART CAGE MANUFACTURING COMPANY, INC., OF BROOKLYN, NEW YORK, A CORPORATION OF NEW YORK.

BIRD-CAGE BOTTOM.

Application filed December 1, 1925. Serial No. 72,425.

This invention relates to bird cages, and particularly to that type wherein a drawer is provided which is adapted to be inserted into and removed from the bottom of the cage. The invention contemplates the provision of a bottom for a bird cage of such construction as prevents the entrance of seed and droppings into places which are difficult to reach for cleaning and contemplates further the provision in a cage of a strong, durable, slidable drawer of good appearance, arranged to catch the dirt falling to the bottom and readily removable for cleaning.

Figure 1:
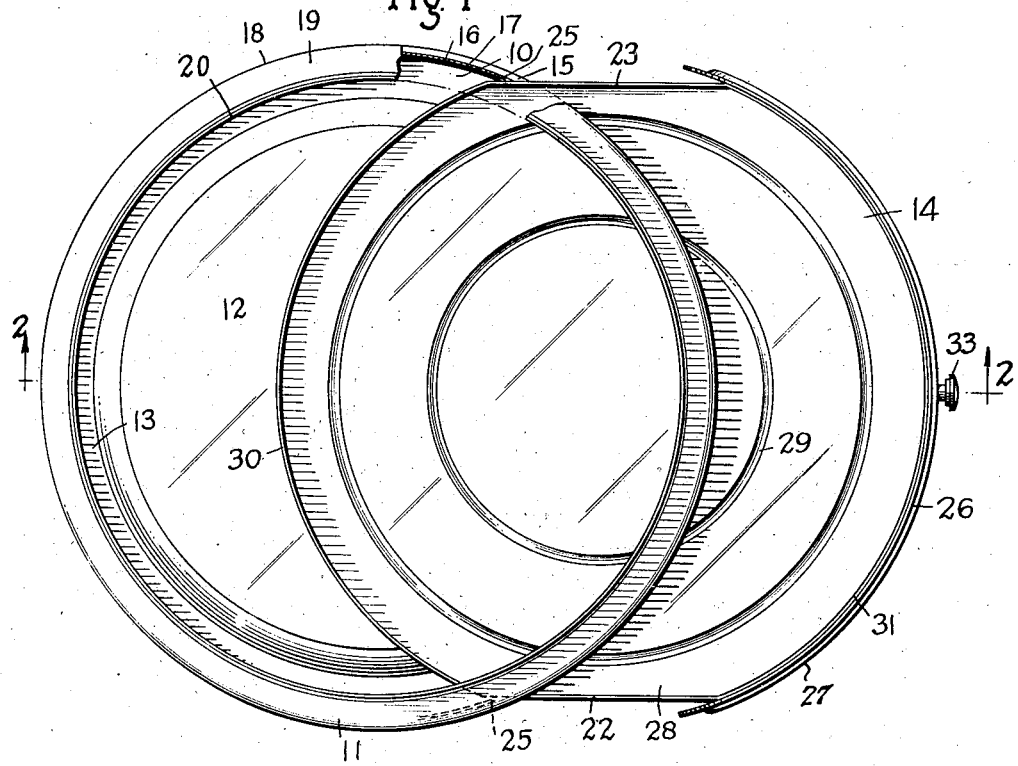
Figure 2:
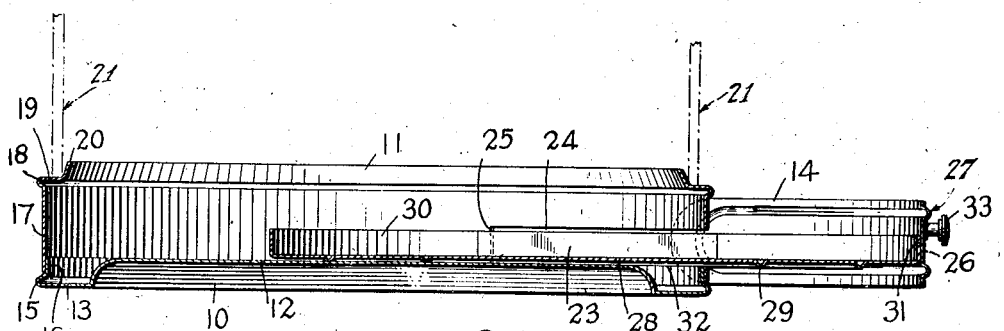

The various objects of my invention will be clear from the description which follows and from the drawings, in which, Fig. 1 is a top plan view of my improved bird cage bottom and the drawer therefor, part of the bottom being broken away to show the underlying drawer, and Fig. 2 is a vertical section of the same on the line 2—2 of Fig. 1.

In that embodiment of my invention illustrated herein, the cage bottom is made preferably of two distinct pieces as 10 and 11, which are suitably joined together to form a unitary structure. The bottom section 10 is provided with a preferably flat bottom surface 12 which is upraised from the lowermost rim 13 on which the cage bottom may rest a sufficient distance to allow the drawer 14 to slide readily into and out of the cage bottom without interference with the object on which the cage may stand. An ornamental strengthening bead as 15 is preferably formed at the peripheral edge of the rim 13, said bead terminating in an upright wall 16 to which the cage supporting section 11 of the cage bottom may be suitably attached. Said supporting section comprises the upright wall 17 terminating at its upper end in the bead 18 which serves to strengthen said wall. Outstanding inwardly from the bead 18 is the substantially horizontally disposed rim 19 which terminates in the preferably upwardly inclined guard wall 20. It is intended that the body as 21 of the cage be supported by the rim 19, preferably in contact with the lower part of the wall 20. The width of the rim 19 that is, the overhang thereof inwardly of the wall, is made sufficient to protect the drawer 14 at the narrowest portion thereof and to prevent the entrance of extraneous matter between said drawer and the bottom 12 when the drawer is in its closed position, as will be more fully described hereinafter. It will be understood that the guard wall 20 aligns and serves to maintain the cage body in proper position.

Difficulty has been experienced heretofore in the provision of drawers for cages of cross-sectional shape other than quadrilateral for the reason that the drawer has usually been made substantially of the same shape and of the same diameter as the cage bottom into which it is usually inserted in order to prevent dirt and waste matter from falling past the sides of the drawers into the bottom of the cage. This previous construction makes it necessary to cut a slot in the cage bottom of the full width of the drawer to allow manipulation thereof. Such a slot extends, therefore, substantially around half of the entire circumference of the cage bottom and thereby weakens said bottom to such an extent as to allow sagging and change of position thereof, whereby the user is often unable to open or shut the drawer without damage thereto. Furthermore, previous constructions allow rotation of the drawer during its inward and outward movement and makes it difficult to align the drawer in its proper position.

To overcome these difficulties I have provided a drawer with a pair of substantially plane parallel sides 22 and 23 spaced apart a distance less than the diameter or width of the cage bottom in which said drawer slides, and of less length than the greatest length of the drawer. It will be understood that the lessened length of the sides 22 and 23 compared with that of the drawer is due to the intersection of the parallel vertical planes forming said sides with the remainder of the vertical drawer wall 30 which may be of any shape conforming generally to that of the cage with which it is used. By reason of the aforementioned construction, I am enabled to shorten the slot 24 in the cage bottom considerably so that said slot is substantially less in circumferential length than half the circumference of the cage bottom, and of less width than that of the cage bottom.

The wall 17 of the cage bottom is thereby considerably strengthened, being cut open for a minor fraction of the length thereof. The ends 25 of the slot 24 serve as guides for the drawer forcing said drawer to move in a straight line path for the major part of its movement.

In the preferred construction of my improved drawer, I provide a front 26 having a suitable rib pressed outwardly from the material thereof for strengthening and ornamenting said front, the width of said drawer front 26 being made sufficient to allow the ends thereof to project over the upper and lower edges of the slot 24 and said front being made of sufficient circumferential length to overlap the ends 25 of said slot, whereby in the closed position of said drawer said slot is entirely concealed from view. Secured to the front 26 is the drawer proper consisting of a bottom 28 having suitable ribs 29 pressed downwardly therefrom, and having a substantially upright wall 30 upstanding therefrom. The front portion 31 of said wall 30 is suitably secured to the drawer front 26, while the sides 22 and 23 of said drawer connect the said front portion 31 of the drawer with the rear portion of the wall 30.

Referring to Fig. 2 it will be seen that the ribs 29 projecting preferably downwardly from the bottom 28, rest on the bottom 12 of the section 10, when the drawer is near its closed position, and also rest during movement thereof on the lower edge 32 of the slot 24, whereby material tilting of the drawer is prevented, said edge 32 and said bottom 12 lying preferably in the same plane. In the closed position of the drawer 14 the rim 19 of the cage bottom section 11 extends inwardly sufficiently to overhang the sides 22 and 23 of the cage bottom and to prevent the passage of any waste matter past the drawer and into the cage bottom. A suitable knob or handle 33 is secured to the drawer front 26 whereby said drawer may be readily manipulated.

In removing the drawer for cleaning, the knob 33 is pulled outwardly, carrying with it the entire drawer which is guided in its outward movement by the ends 25 of the slot 24 and prevented thereby from turning, said drawer resting during its movement on the bottom member 12 and on the lower slot edge 32. The drawer is replaced by inserting said drawer into the slot and pushing the drawer inwardly until the slot ends 25 engage the sides 22 and 23, whereafter said drawer is forced to move only in a straight line into its closed position. In said position an ornamental appearance is presented by the drawer front 26 not only by reason of the ribs 27 thereof but by reason of the fact that the slot 24 is entirely concealed, so that no ugly gaps are exposed.

It will be seen that I have provided an efficient, practical drawer of good appearance for bird cages adapted to catch all of the dirt falling into the lower part of the cage, which drawer may be easily removed for cleaning, which may be readily manipulated, and which is constrained to come to rest in a predetermined operative position.

It is not intended that this invention be limited to the specific embodiment of my invention shown, nor is it intended that my invention be limited only to circular cages, as it will be obvious that by slight changes my invention can readily be adapted to cages of any shape, and that other changes may be made without departing from the spirit of the invention, nor from the scope of the appended claims.

I claim:

1. In a bird cage, a bottom member including a flat bottom rim portion, an outwardly pressed bead at the outer edge of said rim portion, a drawer supporting bottom upraised from the under surface of said bottom member and a substantially upright wall having an opening of less circumferential length than that of half the circumference of said wall, said opening being intermediate of the upper and lower edges of said wall, and a drawer of the width of said opening arranged to slide in said opening and to be supported by said bottom and the lower edge of said opening, said lower edge being in the same horizontal plane, as the upper surface of the drawer supporting bottom.

2. In a bird cage, a bottom section, a drawer member adapted to rest on said bottom section and comprising a curved back subtending less than 180°, of the same radius as the inside cylindrical surface of said bottom section, comparatively short parallel plane sides, and a curved front of the same radius as the back and having ends projecting beyond said sides.

3. In a bird cage, a drawer having plane sides and a partly circular base, the edges of said sides being chords of the remainder of the periphery of said base, curved end surfaces on said drawer each subtending an angle less than 180° and having substantially the same radius of curvature throughout, a front on said drawer secured to one of said end surfaces and extending past the upper and lower edges of the last mentioned end surface and past the juncture of said last mentioned end surface and the most forwardly points on said sides, and a pressed sheet metal bottom member adapted to receive said drawer and having a lower portion for slidably supporting said drawer and a cage supporting member at the upper part of said bottom member.

4. In a bird cage, a bottom section, an upraised central drawer supporting portion in said section, a substantially cylindrical drawer member of the same curvature throughout, adapted to slide on said section, a pair of flat parallel sides cutting off the cylindrical surface of said member into two portions each subtending less than 180° and a drawer front secured to said section at the front thereof and projecting beyond the ends of said flat sides and beyond the upper and lower edges of the drawer.

5. In a bird cage, a drawer comprising a flat bottom having concentric circular ribs pressed downwardly therefrom for allowing the easy sliding of said drawer, a pair of comparatively short flat parallel sides, a back joining the rear extremities of said sides and having a surface other than plane, and a front extending between the front ends of said sides and having a surface of the same size and shape as the back.

6. In a bird cage, having a slot in the lower part thereof of less width than the width of said cage, a drawer the extreme length of which is the same as that of the diameter of the lower part of the cage whereby said drawer in its operative position reaches completely across said lower part, the width of which drawer is the same as that of said slot, said drawer being adapted to be passed through and to rest upon the lower edge of said slot, sides on said drawer of less length than the greatest length of said drawer, curved ends on said drawer each subtending less than 180° and of the same curvature as the lower part of the cage, and means on the lower part of said cage projecting over said sides for protecting the space between said sides and the adjacent portions of said cage.

7. In a bird cage, a bottom section comprising a cage supporting section and a drawer supporting section, a substantially horizontal rim on said cage supporting section for engaging a cage body and maintaining said body in place, a guard wall upstanding from the inner periphery of said rim and of the diameter of the inside of the cage body and a wall integral with and depending from the outer periphery of said rim, said drawer section comprising a substantially flat horizontal rim adapted to serve as a support for the cage, an upright wall outstanding from the outer periphery of said rim and in pressed engagement with the depending wall of said cage supporting section and a concentrically arranged drawer supporting bottom pressed inwardly from and in spaced relation to said rim, said drawer supporting section having a slot therein of less width than the width of said section adapted to receive a drawer for movement into and out of said last mentioned section.

8. In a bird cage, a bottom cage section comprising a plane drawer supporting bottom spaced upwardly from the bottom of section, a substantially horizontal rim spaced above parallel to and projecting over said bottom and a guard wall of the diameter of the inside of the cage at the inner extremity of said rim for aligning and supporting the cage body, said bottom section having a slot therein of less length measured directly between the ends thereof than the width of said section, wherein a drawer may be inserted, the lower edge of said slot lying in the same plane as said drawer supporting section.

9. The combination with a cage bottom having a slot therein of less length than the width of said bottom and including a cage body supporting rim in spaced relation to the lowermost part of said bottom, of a drawer adapted to slide in said slot and on said bottom, said drawer having arcuate ends each of the same curvature, and plane parallel sides, the length of said drawer being equal to the inside diameter of said cage bottom, said cage supporting rim overhanging said drawer a sufficient distance to prevent waste matter from passing outside of the plane sides of said drawer, and into said cage bottom.

10. In a bird cage, a cage bottom having a slot therein of less width than the diameter of that part of said bottom in which said slot is made, a drawer adapted to slide in said slot including a pair of sides of less length than the length of said drawer, and a bottom having concentrically arranged downwardly pressed ribs therein to rest on the lower edge of said slot, a plane horizontal rim on said cage bottom, and a bottom surface pressed from said cage bottom inwardly and upwardly from said rim for supporting said drawer, said upraised bottom lying in the same plane as the lower edge of said slot.

11. In a bird cage, a cage bottom comprising a cage body supporting section including an upright wall, a cage supporting rim of the diameter of the inside of the cage at the upper extremity of said wall, and a guard wall at the inner periphery of said rim, and a drawer supporting section including an upright wall adapted to fit and to be secured to the inner surface of the upright wall of said cage body supporting section, a plane rim at the lowermost end of said wall and a plane horizontal drawer supporting bottom integral with and pressed upwardly from the central part of said drawer supporting section, said section having a slot therein of less length than the width of said drawer supporting section, the lower edge of said slot lying in the same plane as the upper surface of said drawer supporting bottom, and a drawer including a pair of plane parallel sides spaced apart a distance slightly greater than the diameter of the inner peripheral edge of the cage supporting rim of said cage supporting section.

12. In a bird cage, a cage bottom and drawer supporting section of substantially the diameter of said cage comprising a cage body supporting member and a drawer supporting member having a slot therein, a drawer, the length of which is equal substantially to that of said cage bottom, including a pair of sides of less length than the length of said drawer and a rim on said cage supporting section slightly overhanging the sides of said drawer in the closed position of said drawer.

HYMEN ZIMMERMAN.